G. H. WOOD.
SECONDARY ATTACHMENT VALVE.
APPLICATION FILED MAR. 8, 1920.
1,368,204.
Patented Feb. 8, 1921.
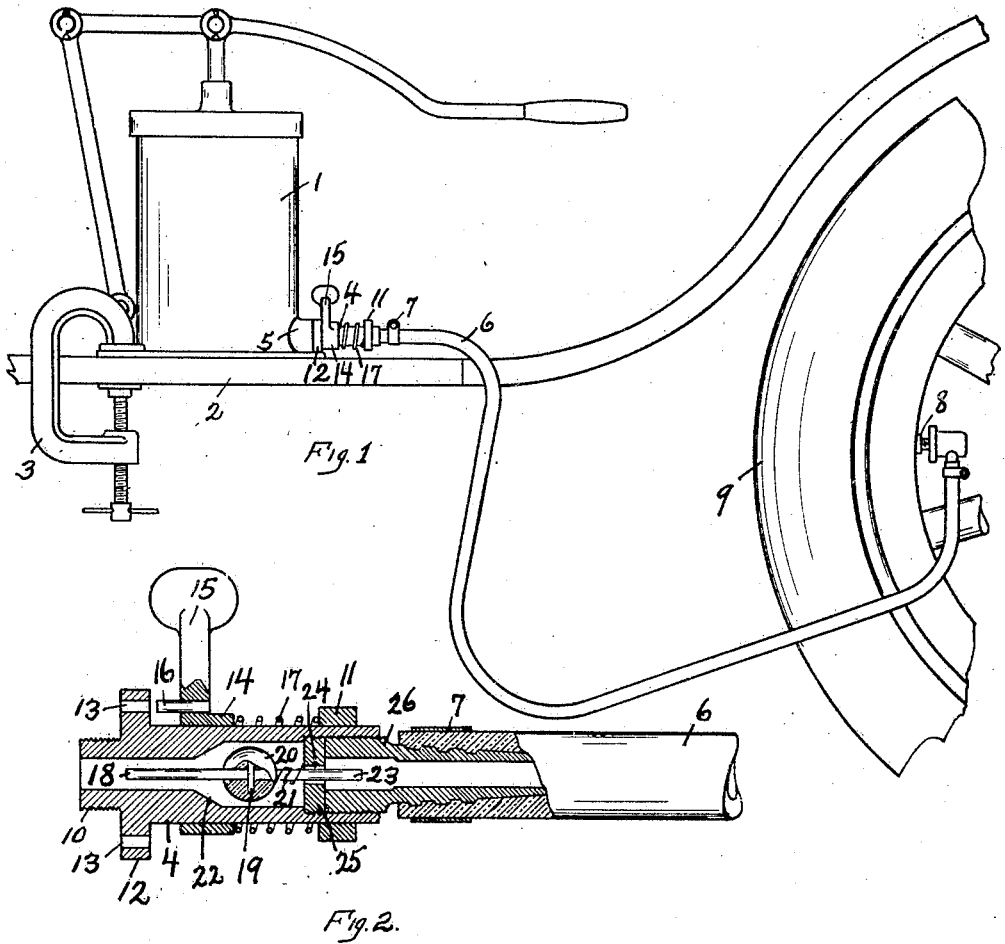
INVENTOR.
G. H. Wood
BY
C. A. Harpman
ATTORNEY.

UNITED STATES PATENT OFFICE.

GEORGE HENRY WOOD, OF YOUNGSTOWN, OHIO.

SECONDARY ATTACHMENT-VALVE.

1,368,204.  Specification of Letters Patent.  Patented Feb. 8, 1921.

Application filed March 8, 1920. Serial No. 364,155.

*To all whom it may concern:*

Be it known that I, GEORGE HENRY WOOD, a citizen of the United States of America, residing at Youngstown, in the county of Mahoning and State of Ohio, have invented certain new and useful Improvements in Secondary Attachment-Valves, of which the following is a specification.

This invention relates to valves and especially to secondary attachment valves. The principal object is to provide a valve, that may be easily attached to ordinary air pumps such as are used for pumping air into auto and bicycle tires.

The invention consists in the features of construction, combinations and arrangements of parts hereinafter set forth, illustrated in the accompanying drawings and more particularly pointed out in the appended claims.

In the drawings Figure 1 is a side elevation showing the valve properly installed.

Fig. 2 is detailed view of the valve partly in section and in an unseated position.

By referring to Fig. 1 it will be seen that 1 is an ordinary auto pump secured to a running board 2 by means of a clamp 3; one end of the valve 4 is turned into a boss 5 which is the outlet of the pump 1. The other end is secured to a hose 6 by means of a clamp 7.

As the air is forced out of the pump 1 it passes through the valve 4, then into the hose 6 on into the valve 8 which is secured to the tire 9.

By means of my improved valve it will be seen I have provided a double valve checking system against the air forced into the tire 8.

By referring to Fig. 2 it will be seen that the valve 4 has a threaded projection 10 which is turned into the boss 5 as shown in Fig. 1. In order to provide a simple and convenient means of turning this valve 4 into said boss 5, I have provided a band 11 on one end of the valve 4.

At the other end of the valve 4 is formed a circular flange 12 provided with a plurality of holes 13 spaced apart near the circumference of the circular flange 12. Fitting snugly upon the circumference of the valve 4 and between the circular flange 12 and the band 11 is an operating member 14 provided with an arm 15. This arm 15 is provided with a pin 16 located upon the arm 15 so as to register with the holes 13 when moved opposite the openings. A coil spring 17 seated against the band 11 slides the operating member 14 against the circular flange 12 when the pin 16 is projected into one of the holes 13.

The valve rod 18 is provided with a flange part 19 near the central part of the valve rod 18. Molded around this flange part 19 is a rubber ball 20. A coil spring 21 tends to hold the rubber ball 20 against the valve seat 22. The end 23 of the valve rod 17 slides loosely through an opening 24 of a supporting member 25 which is threaded within a bore in the exit end of the valve 4. The nipple 26 is threaded and turned into the valve so that its end comes in contact with the supporting member 25.

What I claim is:

1. In a device of the class described, a threaded projection, a circular flange provided with a plurality of holes spaced apart, an operating member maintained upon the outer circumference of said valve, a pin positioned upon said operating member so as to register with said holes spaced apart, a band secured around one end of said valve, a coil spring between said band and said operating member.

2. In a device of the class described, a valve, a valve rod, a flange formed upon said rod, a rubber ball molded around said flange, a supporting member for said valve rod provided with a central opening, a coil spring positioned between said rubber ball and supporting member, a cup shaped seat for said ball, substantially as described for the purpose set forth.

In testimony whereof I affix my signature.

GEORGE HENRY WOOD.

Witnesses:
JOHN P. MEYER,
C. A. HARPMAN.